(12) United States Patent
Namiki

(10) Patent No.: US 11,267,142 B2
(45) Date of Patent: Mar. 8, 2022

(54) IMAGING DEVICE INCLUDING VISION SENSOR CAPTURING IMAGE OF WORKPIECE

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 239 days.

(21) Appl. No.: 16/195,860

(22) Filed: Nov. 20, 2018

(65) Prior Publication Data

US 2019/0184582 A1 Jun. 20, 2019

(30) Foreign Application Priority Data

Dec. 20, 2017 (JP) .............................. JP2017-244517

(51) Int. Cl.
 *B25J 19/02* (2006.01)
 *H04N 5/232* (2006.01)
 *H04N 5/225* (2006.01)

(52) U.S. Cl.
 CPC .......... *B25J 19/023* (2013.01); *H04N 5/2253* (2013.01); *H04N 5/2257* (2013.01); *H04N 5/23229* (2013.01)

(58) Field of Classification Search
 CPC .. B25J 19/023; H04N 5/23229; H04N 5/2253
 See application file for complete search history.

(56) References Cited

U.S. PATENT DOCUMENTS

| 4,727,471 | A | 2/1988 | Driels et al. |
| 5,802,201 | A | 9/1998 | Nayar et al. |
| 8,872,913 | B2 * | 10/2014 | Wang ........................ G06T 7/73 348/95 |
| 9,429,418 | B2 | 8/2016 | Mitarai et al. |
| 10,094,794 | B2 * | 10/2018 | Thompson ........... G06K 9/2018 |
| 10,157,456 | B2 * | 12/2018 | Higo ..................... G06T 7/0004 |
| 2008/0301072 | A1 * | 12/2008 | Nagatsuka ............. B25J 9/1671 706/12 |

(Continued)

FOREIGN PATENT DOCUMENTS

| DE | 102011009814 A1 | 9/2011 |
| DE | 102013021917 A1 | 7/2014 |

(Continued)

*Primary Examiner* — Khoi H Tran
*Assistant Examiner* — Rodney P King
(74) *Attorney, Agent, or Firm* — Hauptman Ham, LLP

(57) ABSTRACT

An imaging device includes a camera, a robot that moves the camera, and a controller that processes an image. A detection surface defined on a workpiece and a set position serving as an imaginary position of the robot for detecting the workpiece are determined in advance. The camera captures a plurality of first images at a plurality of positions. The controller includes an image conversion unit converting the plurality of the first images into a plurality of second images when captured at the set position. The controller includes a composition unit generating a composite image into which the plurality of the second images are composited, and a composite image processing unit performing at least one of detection and inspection of the workpiece on the detection surface on the basis of the composite image.

8 Claims, 10 Drawing Sheets

(56) References Cited

U.S. PATENT DOCUMENTS

| | | | | |
|---|---|---|---|---|
| 2010/0017033 A1* | 1/2010 | Boca | ........................ | B25J 13/06 |
| | | | | 700/258 |
| 2017/0334066 A1* | 11/2017 | Levine | ................... | G06N 3/084 |
| 2018/0017501 A1* | 1/2018 | Trenholm | ............ | G01R 31/308 |
| 2018/0215035 A1* | 8/2018 | Ono | ....................... | B25J 9/1679 |

FOREIGN PATENT DOCUMENTS

| | | |
|---|---|---|
| EP | 1043126 B1 | 8/2008 |
| EP | 2544867 B1 | 7/2017 |
| JP | H0981759 A | 3/1997 |
| JP | 2002310935 A | 10/2002 |
| JP | 2003-305675 A | 10/2003 |
| JP | 2011136377 A | 7/2011 |
| JP | 2012073702 A | 4/2012 |
| JP | 2012194641 A | 10/2012 |
| JP | 2013065280 A | 4/2013 |
| JP | 2014010783 A | 1/2014 |
| JP | 2014228940 A | 12/2014 |
| JP | 2015-160264 A | 9/2015 |
| JP | 2017040598 A | 2/2017 |
| JP | 2017040600 A | 2/2017 |
| JP | 2017040612 A | 2/2017 |
| JP | 2017083430 A | 5/2017 |

\* cited by examiner

IMAGING DEVICE INCLUDING VISION SENSOR CAPTURING IMAGE OF WORKPIECE

RELATED APPLICATIONS

The present application claims priority of Japanese Patent Application No. 2017-244517, filed on Dec. 20, 2017, the disclosure of which is hereby incorporated by reference herein in its entirety.

BACKGROUND OF THE INVENTION

1. Field of the Invention

The present invention relates to an imaging device that includes a vision sensor capturing an image of a workpiece.

2. Description of the Related Art

In related arts, a robot system is known, in which a hand that is attached to a robot grips a workpiece so as to convey the workpiece. When the robot grips a workpiece with the hand, the workpiece may be gripped at a position deviated from a desired position. In addition, a robot system is known, in which an operation tool is attached to a robot so as to perform a predetermined operation on a workpiece fixed to a mounting table. At the time of fixing the workpiece to the mounting table, the position of the workpiece may be deviated from a desired position. In such a robot system, it is preferable to accurately understand the positional deviation, within the hand, of the workpiece gripped by the robot, or the positional deviation of the workpiece fixed to the mounting table.

In recent years, it is known that images captured by a camera are used so as to detect the positional deviation occurring when the robot grips a workpiece with the hand, or the positional deviation of a workpiece fixed to the mounting table. For example, the camera is attached at the tip part of the arm of the robot. In the case where the position of the workpiece disposed on the mounting table is measured, the camera captures an image of the workpiece. The position of the workpiece on the mounting table can be detected on the basis of images of the workpiece (e.g., Japanese unexamined Patent Application Publication No. 2015-160264 and Japanese unexamined Patent Application Publication No. 2003-305675).

SUMMARY OF INVENTION

In order to detect the workpiece fixed to the mounting table or the workpiece supported by the robot, a vision sensor may be disposed at a predetermined position so as to capture the image of the workpiece. In order to detect the workpiece from the image captured by the vision sensor, the feature such as the outline of the workpiece may be used. However, the image may not be clear depending on the condition where the image is captured, and the image that is suitable for detection of the workpiece may not be obtained. For example, the intensity or direction of the sunlight that comes through a window of a building may change, or the intensity or direction or the like of the illumination disposed in a building may change. In other words, the intensity or direction of the environmental light changes in some cases.

When the intensity or direction of the environmental light changes, the brightness of the surface of the workpiece that is to be captured by a camera changes, which may result in a reduction in contrast of the image. Alternatively, in the case of a glossy workpiece, the brightness excessively increases due to regular reflection of light on the surface of the workpiece, which may result in not allowing the feature such as the outline of the workpiece to appear in the image. In other words, halation may take place in the image. In the case where a portion that includes the feature such as the outline is not shown in the image, the workpiece may not be detected, or states of the surface of the workpiece may not be correctly measured.

An imaging device according to one aspect of the present disclosure include a vision sensor that captures a first image of a workpiece and a movement device that moves one of the workpiece and the vision sensor so as to change a relative position of the one of the workpiece and the vision sensor with respect to the other. The imaging device includes an image processing device that processes the first image. The image processing device includes a storage unit that stores a set of the first image and a position of the movement device at the time of capturing the first image. A detection surface that is defined on the workpiece and a set position that serves as a position of the movement device are set in advance, and are stored in the storage unit. The vision sensor captures a plurality of first images such that relative positions of the vision sensor with respect to the workpiece mutually differ. The image processing device includes an image conversion unit that converts the plurality of the first images into a plurality of second images when the images are assumed to be captured at the set position, on the basis of a position of the movement device at the time of capturing the first image. The image processing device includes a composition unit that generates a composite image into which the plurality of the second images are composited. The image processing device includes a composite image processing unit that performs at least one of detection and inspection of the workpiece on the detection surface on the basis of the composite image.

An imaging device according to another aspect of the present disclosure includes a plurality of vision sensors that each capture a first image of a workpiece, a first fixation part that fixes the workpiece, and a second fixation part that fixes a vision sensor. The imaging device includes an image processing device that processes the first image. The plurality of the vision sensors are disposed such that the images of the workpiece are captured from positions that are different from each other. The image processing device includes a storage unit that stores a set of the first images captured by the plurality of the vision sensors and positions of the vision sensors that capture the first images. A detection surface that is defined on the workpiece and a detection position that serves as the position of the vision sensor used for detecting the workpiece are determined in advance, and are stored in the storage unit. The image processing device includes an image conversion unit that converts the plurality of the first images captured by the plurality of the vision sensors into a plurality of second images when the images are assumed to be captured at the detection position, on the basis of the position of each of the vision sensors. The image processing device includes a composition unit that generates a composite image into which the plurality of the second images are composited. The image processing device includes a composite image processing unit that performs at least one of detection and inspection of the workpiece on the detection surface on the basis of the composite image.

DETAILED DESCRIPTION

An imaging device according to an embodiment will be described with reference to FIGS. 1 to 14. The imaging device according to the present embodiment detects and/or inspects a workpiece on the basis of an image captured by a vision sensor.

Figure 1:
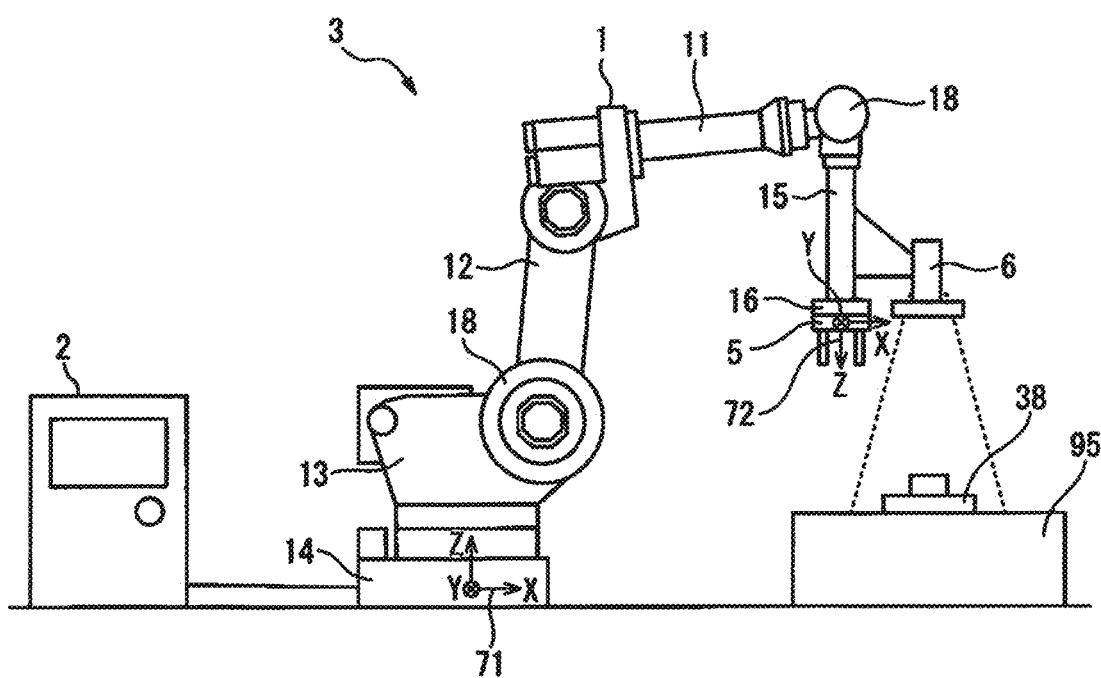
FIG. 1 is a side view of a first robot system according to an embodiment.
Figure 2:
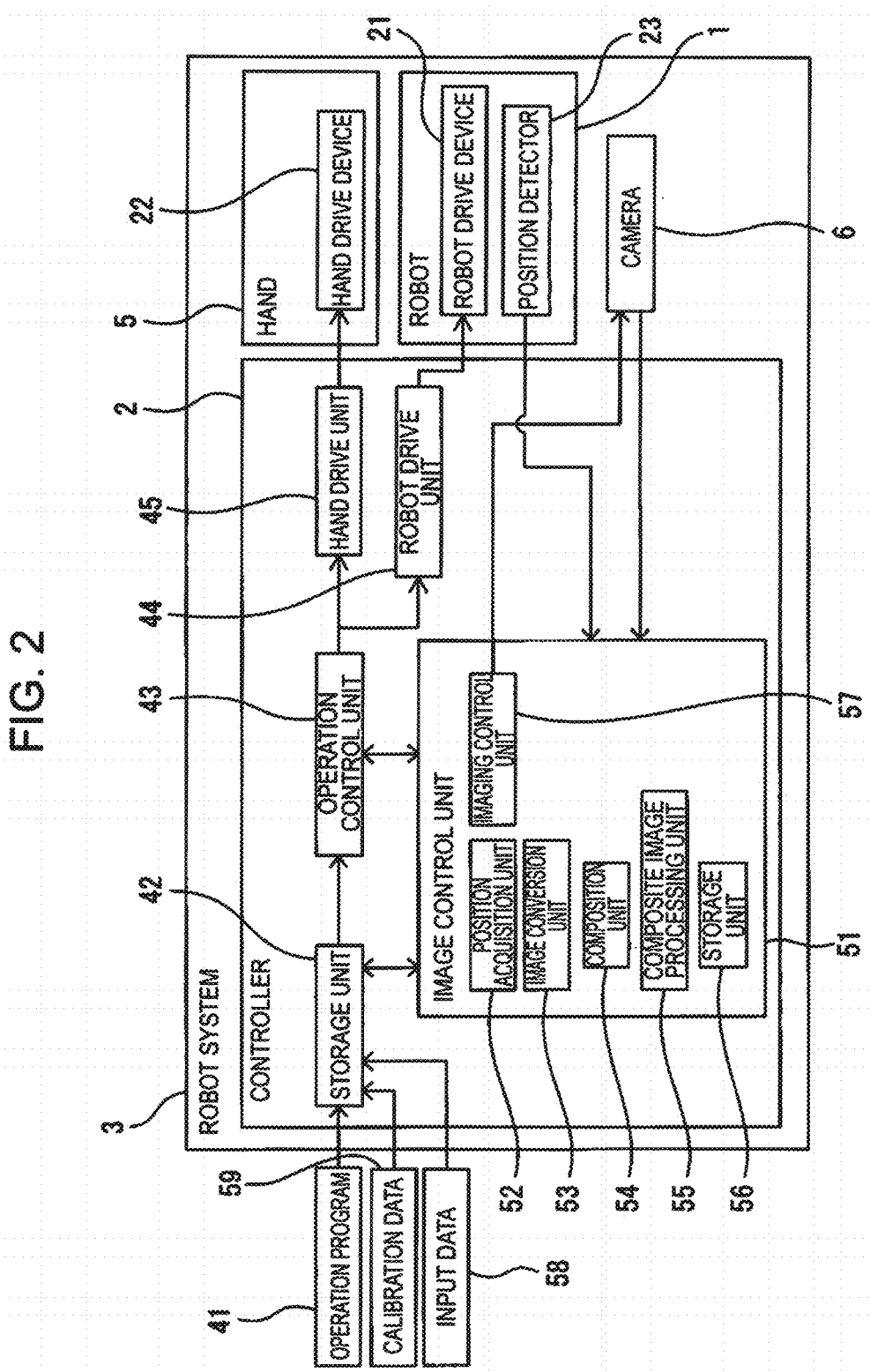
FIG. 2 is a block diagram of a robot system according to the embodiment.

FIG. 1 is a schematic view of a first robot system according to the present embodiment. FIG. 2 is a block diagram of a robot system according to the present embodiment. Referring to FIGS. 1 and 2, a robot system 3 includes a hand 5 that grips a workpiece 38, and a robot 1 that moves the hand 5. The robot system 3 includes a controller 2 that controls the robot system 3. In addition, the robot system 3 includes a mounting table 95 on which the workpiece 38 is mounted.

The hand 5 according to the present embodiment is an end effector that grips and releases the workpiece 38. The end effector attached to the robot 1 is not limited to this form, and it may be possible to employ any operation tool that is appropriate for the operation that the robot system 3 performs. For example, as the end effector, it may be possible to employ an operation tool for welding, or an operation tool for applying a seal material onto the surface of the workpiece, or the like. In addition, only a camera 6 may be attached to a hand tip of the robot 1 without attaching any operation tool to the hand tip of the robot 1.

The robot 1 according to the present embodiment is an articulated robot including a plurality of joints 18. The robot 1 includes an upper arm 11 and a lower arm 12. The lower arm 12 is supported by a rotation base 13. The rotation base 13 is supported by a base 14. The robot 1 includes a wrist 15 that is connected to an end portion of the upper arm 11. The wrist 15 includes a flange 16 for fixing the hand 5. A constituent member of the robot 1 is formed so as to rotate around a predetermined drive axis. The form of the robot is not limited to such a form, and it may be possible to employ any robot that can move the operation tool.

The robot 1 according to the present embodiment includes a robot drive device 21 that drives constituent members such as the upper arm 11. The robot drive device 21 includes drive motors that drive the upper arm 11, the lower arm 12, the rotation base 13, and the wrist 15. Directions of respective constituent members of the robot 1 change at the joint 18, whereby the position and the orientation of the robot 1 change. The hand 5 includes a hand drive device 22 that drives the hand 5. The hand drive device 22 according to the present embodiment drives the hand 5 with pneumatic pressure. The hand drive device 22 includes a pneumatic pump and a solenoid valve for supplying cylinders with compressed air.

The controller 2 controls the robot 1 and the hand 5. The controller 2 includes an arithmetic processing device (calculator) having a CPU (central processing unit), and a RAM (random access memory), a ROM (read only memory) and the like that are connected to CPU via a bus. The robot 1 is driven in accordance with actuation commands from the controller 2. The robot 1 automatically conveys the workpiece 38 in accordance with an operation program 41. The robot drive device 21 and the hand drive device 22 are controlled by the controller 2.

The operation program 41 that has been prepared in advance in order to operate the robot 1 is inputted into the controller 2. The operation program 41 is stored in a storage unit 42. An operation control unit 43 sends, to a robot drive unit 44, an actuation command for driving the robot 1 in accordance with the operation program 41. The robot drive unit 44 includes an electrical circuit for driving drive motors, and supplies the robot drive device 21 with electricity in accordance with actuation commands.

In addition, the operation control unit 43 sends an actuation command for driving the hand drive device 22, to a hand drive unit 45. The hand drive unit 45 includes an electrical circuit for driving the pneumatic pump and the like, and supplies the pneumatic pump and the like with electricity in accordance with actuation commands.

The robot 1 includes a state detector for detecting a position and an orientation of the robot 1. The state detector according to the present embodiment includes a position detector 23 that is attached to a drive motor for each drive axis of the robot drive device 21. For example, the position detector 23 can detect rotation angles at the time when the drive motor of the robot drive device 21 is driven. The position and the orientation of the robot 1 is detected by the output from the position detector 23. The state detector is not limited to the position detector that is attached to the drive motor, and it may be possible to employ any detector that can detect the position and the orientation of the robot 1.

A reference coordinate system 71 that does not move, when the position and the orientation of the robot 1 change, is set in the robot system 3. In the example illustrated in FIG. 1, the origin of the reference coordinate system 71 is disposed in the base 14 of the robot 1. The reference coordinate system 71 is also referred to as a world coordinate system. In the reference coordinate system 71, the position of the origin is fixed, and the direction of each coordinate axis is also fixed. Neither the position nor the orientation of the reference coordinate system 71 change even if the position and the orientation of the robot 1 change. The reference coordinate system 71 has an X-axis, a Y-axis, and a Z-axis, each of which serves as a coordinate axis and which are perpendicular to each other. In addition, a W-axis is set as a coordinate axis around the X-axis. A P-axis is set as a coordinate axis around the Y-axis. An R-axis is set as a coordinate axis around the Z-axis.

In addition, a flange coordinate system 72 is set on a face of the surface of the flange 16 on which the hand 5 is fixed. The flange coordinate system 72 is also referred to as a hand-tip coordinate system. The origin of the flange coordinate system 72 is disposed on the rotation axis of the flange 16. The flange coordinate system 72 has an X-axis, a Y-axis, and a Z-axis, which are perpendicular to each other. In addition, the flange coordinate system 72 has a W-axis around the X-axis, a P-axis around the Y-axis, and an R-axis around the Z-axis. When the position and the orientation of the robot 1 change, the position of the origin of the flange coordinate system 72 and the orientation of the coordinate system also change in association with the flange 16. By converting coordinate values of the flange coordinate system 72 through matrix, it is possible to calculate coordinate values of the reference coordinate system 71. In addition, by converting coordinate values of the reference coordinate system 71 through matrix, it is possible to calculate coordinate values of the flange coordinate system 72.

The robot system 3 according to the present embodiment includes an imaging device that performs at least one of detection and inspection of the workpiece 38. In the case of the first robot system 3, the position of the workpiece 38 on the mounting table 95 is detected before the hand 5 grips the workpiece 38. The imaging device includes the camera 6 that serves as a vision sensor that captures a first image of the workpiece 38. The first image is an image that is obtained by actually capturing the image of the workpiece 38 using the camera 6. The camera 6 according to the present embodiment is a camera that captures a two-dimensional image. The camera 6 is supported by the robot 1. The camera 6 is fixed on the wrist 15 through a support member. The camera 6 is fixed to the robot 1 so as to be able to capture the image of the workpiece 38 with the robot 1 changing its position and orientation.

The imaging device according to the present embodiment includes a movement device that moves one of the workpiece 38 and the camera 6 so as to change a relative position of the one of the workpiece and the camera with respect to the other. In the robot system 3, the robot 1 functions as the movement device, and the camera 6 is mounted at the hand tip of the robot 1. When the position and the orientation of the robot 1 change, the position and the orientation of the camera 6 also change. In addition, the mounting table 95 functions as a fixation part for fixing the workpiece 38.

The imaging device includes an image processing device that processes the first image captured by the vision sensor. In the case of the robot system 3 according to the present embodiment, the controller 2 functions as the image processing device. The controller 2 includes an image control unit 51. The image control unit 51 includes an imaging control unit 57 that sends, to the camera 6, a command for capturing an image. The image control unit 51 has a function of processing a first image captured by the camera 6. The image control unit 51 includes a storage unit 56 that stores information on imaging of the workpiece 38.

Figure 3:
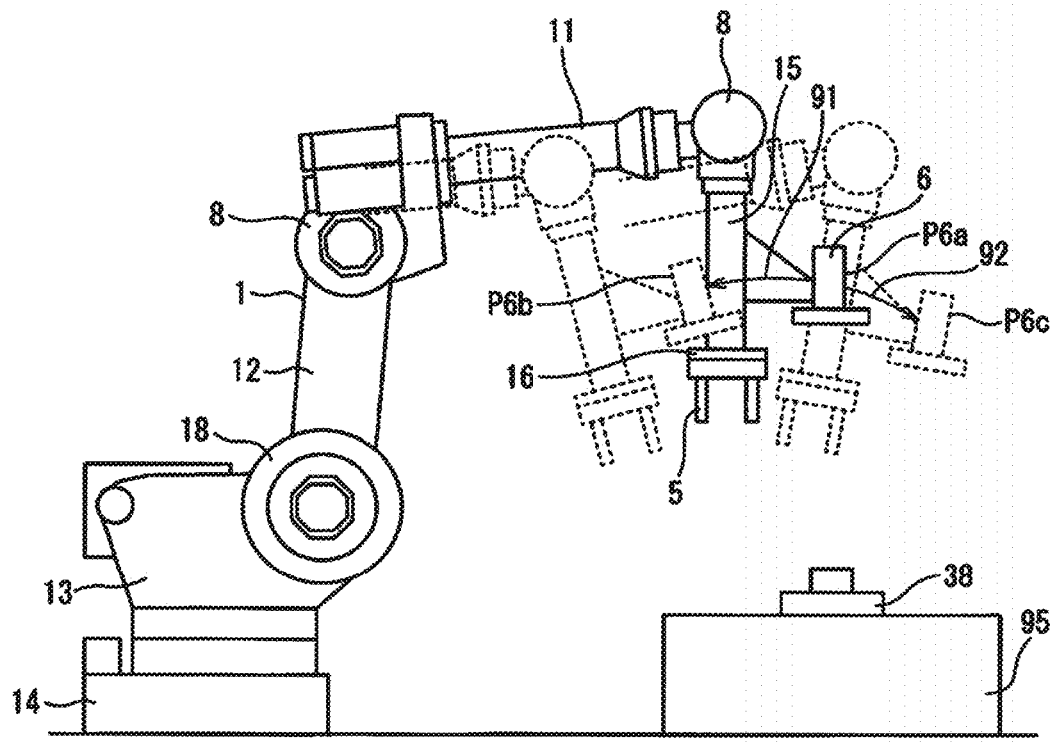
FIG. 3 is a side view of a robot for illustrating movement of a camera in the first robot system.

FIG. 3 shows a side view of the robot for illustrating the movement of the camera when the image of the workpiece is captured. When the position and the orientation of the robot 1 change, the position and the orientation of the camera 6 change. The camera 6 may be disposed at any position in which the image of the workpiece 38 can be captured. In the case of the first robot system 3, the images of the workpiece 38 are captured at a plurality of predetermined positions of the camera 6. The camera 6 captures a plurality of first images at different imaging positions. In the example illustrated in FIG. 3, the camera 6 captures the image of the workpiece 38 at the position P6a. Then, after the robot 1 moves the camera 6 from the position P6a to the position P6b as indicated by the arrow 91, the camera 6 captures the image of the workpiece 38. Furthermore, after the robot 1 moves the camera 6 to the position P6c as indicated by the arrow 92, the camera 6 captures the image of the workpiece 38. In this way, a plurality of first images of the workpiece 38 are captured such that a plurality of relative positions of the camera 6 with respect to the workpiece 38 mutually differ. The plurality of the positions P6a, P6b, P6c of the camera 6 at which the first images are captured are predetermined. In addition, the positions and the orientations of the robot 1, which correspond to the positions P6a, P6b, P6c, are set in the operation program 41. The camera 6 captures a plurality of first images at a plurality of predetermined positions and orientations of the robot 1.

Note that the camera 6 may capture a plurality of first images without predetermining the plurality of the positions and orientations of the robot 1. For example, the initial position of the camera 6 may be set to be the position P6a, and the position of the camera 6 after movement may be set to be the position P6b. The images of the workpiece 38 may be captured at constant time intervals during the time when the camera 6 is being moved from the position P6a to the position P6b with the robot 1 being driven. In such a case, it is necessary that the positions and the orientations of the robot 1 at the moment when the camera 6 captures the first images are associated with the corresponding first images so as to form a set of the first image and the position and the orientation of the robot 1, and this set is stored in the storage unit 56. Here, although the position and the orientation of the robot 1 are stored, the embodiment is not limited to this. The position and the orientation of the camera 6 or other position that can be calculated on the basis of the position and the orientation of the robot 1 may be stored in the storage unit 56.

Figure 4:
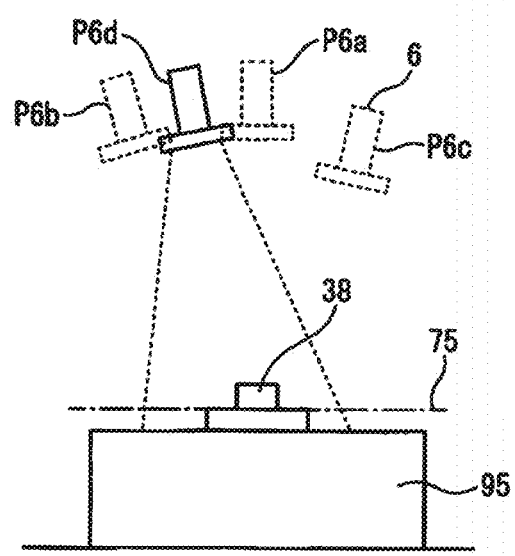
FIG. 4 is a side view of a camera and a workpiece for illustrating a detection position of the camera.

FIG. 4 shows a side view for explaining positions of the camera where the images of the workpiece are captured and the position of the camera that corresponds to an image used for detecting the workpiece. In the present embodiment, a detection surface 75 used for detecting the workpiece 38 is defined in advance on the workpiece 38. The image control unit 51 detects the position of the workpiece 38 on the detection surface 75. The detection surface 75 can be set so as to extend along the surface of part of the workpiece 38. In particular, the detection surface 75 can be set so as to include the surface of part of the workpiece 38. The image control unit 51 uses feature points or brightness values shown on this surface so as to perform at least one of detection and inspection of the workpiece 38. The detection surface 75 can be expressed in the reference coordinate system 71. Information on the detection surface 75 is stored in the storage unit 56. Various portions can be used for the feature points, and in the case of the present embodiment, edge points are used as the feature points. The edge points are points where the intensity gradient is large in the image, and can be used in order to obtain the shape of the outline of the workpiece 38. The method for extracting edge points is known, and hence, explanation thereof will not be made here.

The positions where the camera 6 captures first images are the positions P6a, P6b, P6c. On the other hand, a detection position P6d, which is a position of the camera 6 where the workpiece 38 is detected, is determined in advance. The detection position P6d is an imaginary position set by an operator. The detection position P6d can be set at any position at which the camera 6 can capture the image of the workpiece 38. In addition, the position and orientation of the robot 1 used for positioning the camera 6 at the detection position 6d are predetermined as the set position of the movement device. The position and the orientation of the robot 1 are stored in the storage unit 56. Information on the detection position P6d of the camera 6 may be stored by using the reference coordinate system 71 in the storage unit 56. Note that the detection position P6d is not limited to an imaginary position, and one position may be selected from among positions of the camera 6 where a plurality of first images are captured.

Figure 5:
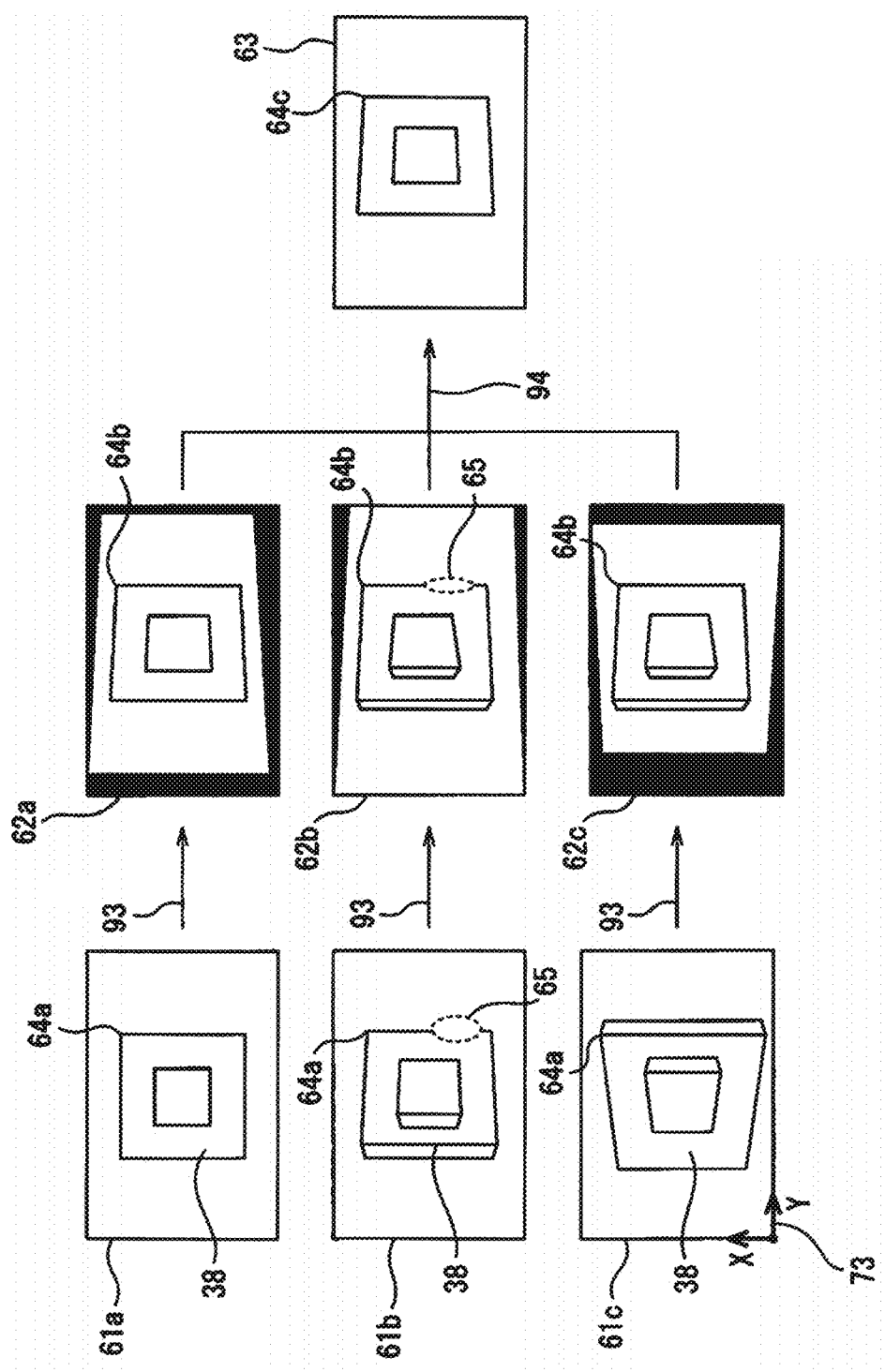
FIG. 5 is a diagram of images to be processed by a controller.

FIG. 5 shows a schematic view for explaining a first image captured in the present embodiment and processes of the first image. Referring to FIGS. 2, 4, and 5, the camera 6 captures first images 61a, 61b, 61c at positions P6a, P6b, P6c. The first image 61a is an image captured by the camera 6 at the position P6a, the first image 61b is an image captured by the camera 6 at the position P6b, and the first image 61c is an image captured by the camera 6 at the position P6c. Next, the image control unit 51 converts the first images 61a, 61b, 61c into second images 62a, 62b, 62c respectively when captured at the detection position P6d, as indicated by the arrow 93.

The second images 62a, 62b, 62c are images obtained on the assumption that the workpiece 38, which is shown in the first images 61a, 61b, 61c captured by the camera 6, is captured from the detection position P6d. The second image 62a is an image obtained by converting the first image 61a into it, the second image 62b is an image obtained by converting the first image 61b into it, and the second image 62c is an image obtained by converting the first image 61c into it.

Next, the image control unit 51 composites the plurality of the second images 62a, 62b, 62c so as to generate one composite image 63 as indicated by the arrow 94. Some edge point of the workpiece 38 may be unclear in the first images 61a, 61b, 61c that have been actually captured. For example, the line of the outline of the workpiece 38 may be unclear due to occurrence of halation at a portion 65 of the first image 61b that has been actually captured. Even in such a case, it is possible to exclude the unclear portion by generating the composite image 63.

As a result, the image control unit 51 can accurately detect the position of the workpiece 38. After this, the operation control unit 43 corrects the position and the orientation of the robot 1 on the basis of the position of the workpiece 38. This control enables the hand 5 to grip the workpiece 38.

Next, with reference to FIG. 2 to FIG. 5, a control of the present embodiment will be described in detail. The operator performs calibration of the camera 6 in advance. It is assumed that calibration data 59 are obtained in order to associate a relationship between a camera coordinate system which serves as a basis for measurement processing by the camera 6 and the reference coordinate system. The calibration data 59 are stored in the storage unit 42. The image control unit 51 obtains the calibration data 59 from the storage unit 42, and store them in the storage unit 56. The calibration data 59 include intrinsic parameters including information, for example, on the focal distance of the camera 6 and distortion of a lens. In addition, the calibration data 59 include extrinsic parameters including a relative positional relationship of the flange coordinate system 72 relative to the image coordinate system 73 in the first image captured by the camera 6.

Furthermore, the operator inputs input data 58 into the controller 2. The input data 58 are stored in the storage unit 42. The image control unit 51 obtains the input data 58 from the storage unit 42, and stores them in the storage unit 56. The input data 58 include information on the detection surface 75. The detection surface 75 can be set on a flat surface. Alternatively, the detection surface 75 may include a curve, or may be formed by connecting a plurality of polygons with each other.

The detection surface 75 according to the present embodiment is set in advance by an operator. The detection surface is not limited to this mode, and it may be possible that a predetermined surface of the workpiece is measured by using another sensor, and a detection surface is set so as to include this predetermined surface.

In addition, the operator predetermines which position of the image is used in order to generate a composite image which is to be generated in the end. The input data 58 include the position and the orientation of the robot 1 in order to arrange the camera 6 at the detection position P6d for detecting the position of the workpiece 38. For an image that corresponds to the detection position P6d, it may be possible to employ conditions that are different from imaging conditions employed when the image of the workpiece 38 is actually captured. For example, for an image that corresponds to the detection position P6d, it may be possible to set values that are different from those used when an image is actually captured, with respect to the focal distance, the view angle, the number of pixels, the lens distortion, and the like of the camera. These pieces of information may be included in the input data 58.

The position and the orientation of the robot 1 for capturing the first image are set in advance in the operation program 41. In accordance with the operation program 41, the operation control unit 43 changes the position and the orientation of the robot 1 so as to capture the image of the workpiece 38. The imaging control unit 57 sends, to the camera 6, a command for capturing the image of the workpiece 38 when the robot 1 reaches the position and the orientation that have been predetermined. The camera 6 captures first images of the workpiece 38 at a plurality of predetermined positions P6a, P6b, P6c. Although, in FIG. 3, the first images 61a, 61b, 61c are captured at the positions P6a, P6b, P6c, the embodiment is not limited to this, and it may be possible to capture two or more first images from any positions. As for the position of the camera 6 that captures the image of the workpiece 38, it may be possible to select any position where the workpiece 38 falls within the visual field of the camera 6. In this way, the images of the workpiece 38 are captured from a plurality of viewpoints.

Although a plurality of drive axes of the robot 1 are driven in the example illustrated in FIG. 3, the embodiment is not limited to this, and it may be possible to operate a single drive axis so as to change the position of the camera 6. By adopting this control, an error that occurs when the constituent member of the robot 1 operates at drive axis is suppressed. In addition, although the direction of the camera 6 (direction of the optical axis) is changed in the example illustrated in FIG. 3, the embodiment is not limited to this, and it may be possible to perform parallel translation of the camera 6 without changing the direction of the camera 6.

The image control unit 51 includes a position acquisition unit 52 that obtains a relative position of the camera 6 with respect to the workpiece 38. The position acquisition unit 52 obtains the position and the orientation of the robot 1 when the image of the workpiece 38 is captured. The position acquisition unit 52 calculates the position of the camera 6 when the image of the workpiece 38 is captured, on the basis of the position and the orientation of the robot 1 and the calibration data 59. The storage unit 56 stores a plurality of the first images captured by the camera 6 at a plurality of positions. In addition, the storage unit 56 stores a set of the position and the orientation of the robot 1 when the first image is captured and the first image.

The image controller 51 includes an image conversion unit 53 that converts a plurality of the first images 61a, 61b, 61c captured by the camera 6, into a plurality of the second images 62a, 62b, 62c when the images are assumed to be captured at the detection position P6d, on the basis of the relative position of the camera 6 relative to the detection surface 75. In this example, the image conversion unit 53 converts the first images 61a, 61b, 61c on the basis of the positions and the orientations of the robot 1 when the images of the workpiece 38 are captured, the position and the orientation being stored so as to be associated with the first images 61a, 61b, 61c. The image conversion unit 53 performs conversion into second images 62a, 62b, 62c of the workpiece 38, each of which is obtained when it is assumed that workpieces 38 included in the first images 61a, 61b, 61c are each captured at the set position of the robot 1 that corresponds to the detection position P6d. The second images 62a, 62b, 62c can be said to be imaginary images captured from the same imaginary position. Next, description will be made of a process in which the first images 61a, 61b, 61c that are actually captured in FIG. 5 are converted into a second image 62a when being captured at the detection position P6d.

Figure 6:
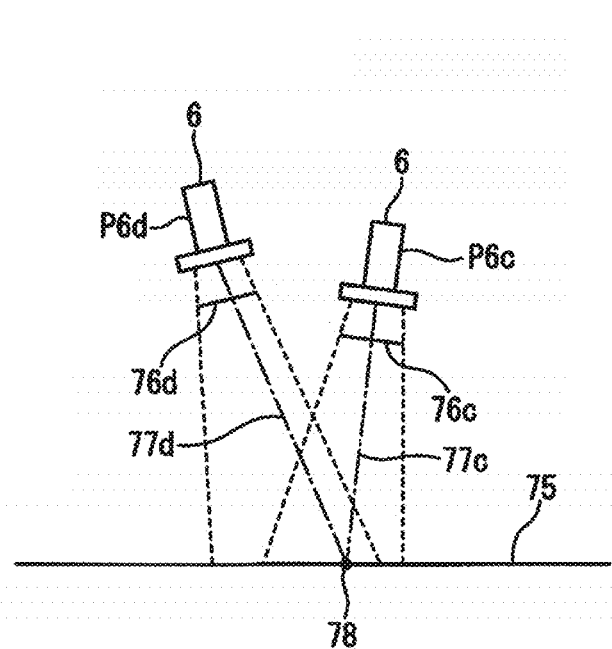
FIG. 6 is a side view of the camera and the detection surface for illustrating the relationship between pixels in an actually captured first image and pixels in a second image at the time of being assumed that the camera is disposed at a detection position.

FIG. 6 shows a side view for explaining the line of sight of the camera when the first image is actually captured and the line of sight of the camera disposed at the detection position. FIG. 6 shows the camera 6 disposed at the position P6c where the imaging is actually performed, and the camera 6 disposed at the detection position P6d. Imaging surfaces 76c, 76d may be set within the angle of view of the camera 6. The imaging surfaces 76c, 76d each simulate a surface of an image sensor, such as a CCD (charge coupled device) sensor and a CMOS (complementary metal oxide semiconductor) sensor, which are disposed within the camera 6.

As illustrated in the first image 61c in FIG. 5, an image coordinate system 73 can be set in the image captured by the camera 6. The image coordinate system 73 is a two-dimensional coordinate system in the captured image with a predetermined position being the origin thereof. The image coordinate system 73 has an X-axis and a Y-axis, which are perpendicular to each other. A position in the image can be specified by using the coordinate value of the image coordinate system 73. In addition, the image coordinate system 73 can be set on the imaging surfaces 76c, 76d.

If the calibration data 59 on the camera 6 have been obtained, when a three-dimensional point (hereinafter, referred to as a gazing point) is given in the reference coordinate system 71, it is possible to calculate the position of the three-dimensional point on the image, i.e., the two-dimensional point in the image coordinate system 73. In addition, when a two-dimensional point, which serves as an image on a predetermined gazing point, in the image coordinate system 73 is given, it is possible to calculate the line of sight (three-dimensional straight line passing through the gazing point and the focal point of the camera 6) in the reference coordinate system 71. When one point is selected in the first image 61c, the camera 6 can calculate a line of sight 77c corresponding to the one point and extending from the camera 6. The line of sight 77c can be expressed by using the flange coordinate system 72.

In other words, on the basis of an arbitrary point in the image coordinate system 73, it is possible to obtain the line of sight 77c of the camera 6 in the flange coordinate system 72. In addition, on the basis of the position and orientation of the robot 1, it is possible to obtain the position of the origin of the flange coordinate system 72 and the orientation of the flange coordinate system 72 in the reference coordinate system 71. Thus, the line of sight 77c expressed in the flange coordinate system 72 can be converted into the line of sight 77c expressed in the reference coordinate system 71.

On the contrary to this, when one point in the reference coordinate system 71 is set, it is possible to calculate the line of sight 77c in the reference coordinate system 71. In addition, on the basis of the line of sight 77c in the reference coordinate system 71, it is possible to calculate a position of the point corresponding in the image coordinate system 73.

With reference to FIGS. 4 to 6, description will be made, as an example, of a first image 61c corresponding to the position P6c and a second image 62c after conversion. The image conversion unit 53 selects the center point in an arbitrary pixel in the second image 62c that is assumed to be captured by the camera 6 disposed at the detection position P6d. For example, the image conversion unit 53 selects a point 64b which is the center point in one pixel. The image conversion unit 53 calculates the line of sight 77d expressed in the flange coordinate system 72, on the basis of the position of the point 64b in the image coordinate system 73. In addition, the image conversion unit 53 calculates the line of sight 77d expressed in the reference coordinate system 71.

The image conversion unit 53 calculates an intersection point 78 between the line of sight 77d and the detection surface 75. The position of this intersection point 78 can be expressed in the reference coordinate system 71. Next, the image conversion unit 53 calculates the line of sight 77c passing through the intersection point 78 in connection with the camera 6 disposed at the position P6c where the imaging is actually performed. The image conversion unit 53 changes the line of sight 77c expressed in the reference coordinate system 71, into the line of sight 77c expressed in the flange coordinate system 72. In addition, the image conversion unit 53 calculates the position in the image coordinate system 73 on the imaging surface 76c where the imaging is actually performed, on the basis of the line of sight 77c. In this way, it is possible to calculate the position of the point 64a in the first image 61c.

Figure 7:
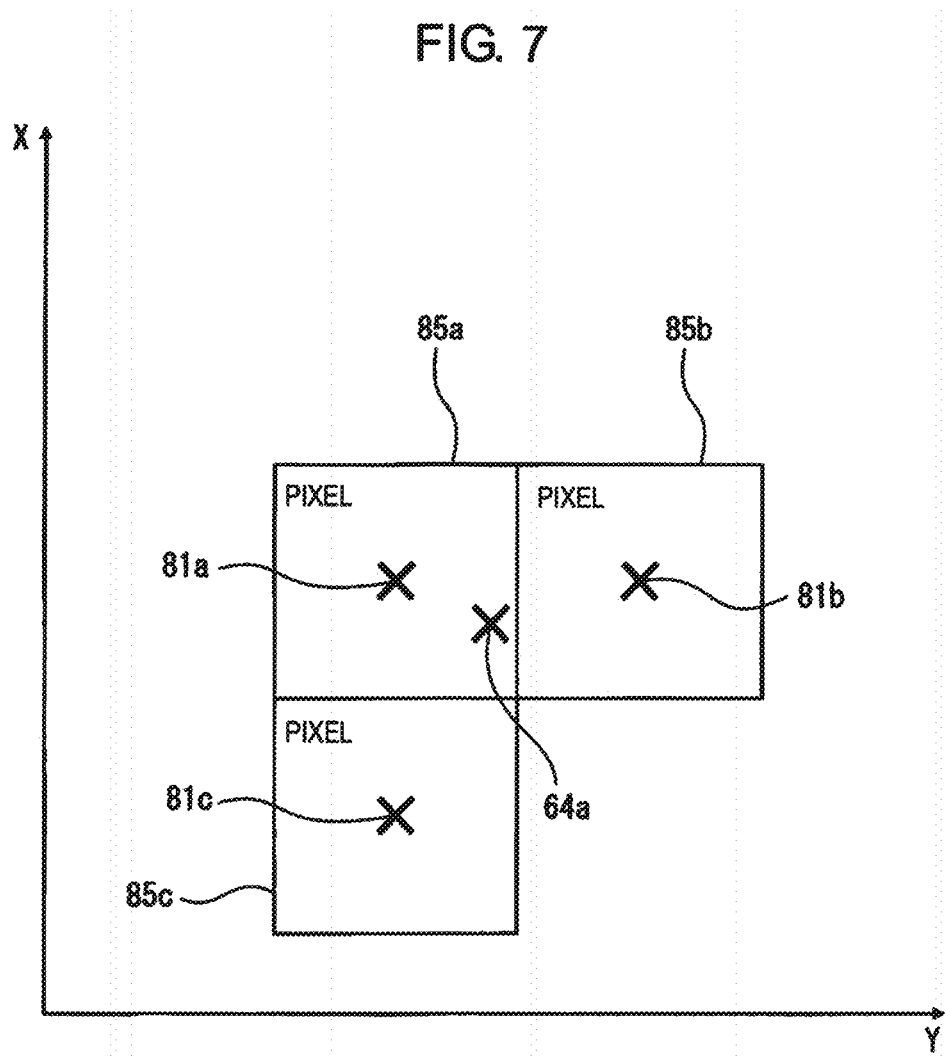
FIG. 7 is a diagram for illustrating pixels obtained by enlarging the first image that has been actually captured.

FIG. 7 shows an enlarged view for illustrating a first image that is actually captured. FIG. 7 shows pixels 85a, 85b, 85c in the neighborhood of the point 64a that corresponds to the point 64b in the second image 62c. The position of the point 64a serves as the corresponding position that corresponds to the center point 64b of the pixel in the second image 62c at the detection position P6d. The point 64a is disposed within the pixel 85a including the center point 81a. Thus, the image conversion unit 53 can set a value of pixel of which center is the point 64b in the second image 62c to a value of pixel of the pixel 85a in the first image 61c. The value of the pixel represents a value concerning luminance or color of the pixel, and for example, it may be possible to employ brightness.

The image conversion unit 53 performs calculation of the pixel value in the second image 62c for all the pixels included in the second image 62c. By adopting this control, the image conversion unit 53 can generate the second image 62c.

Note that, in the case where a position in the first image 61c that corresponds to a position in the second image 62c falls outside the range of the first image 61c, it can be possible to set a predetermined value for the value of the pixel in the second image 62c. In the example of the second image 62c in FIG. 5, when no corresponding pixel exists in the first image 61c that is captured by the camera 6, the brightness of the pixel in the second image 62c is set to be zero. In other words, the pixel value is set so as to be black in the second image 62c.

In addition, in order to accurately obtain the pixel value, the pixel value of the pixel 85b, 85c in the neighborhood of the pixel 85a including the point 64a in the first image 61c can be used so as to calculate the pixel value of the pixel in the second image 62c. In the present embodiment, linear interpolation is performed between pixel values of a plurality of pixels 85b, 85c in the vicinity of the point 64a and the pixel value of the pixel 85a including the point 64a, whereby the value of the pixel including the point 64b in the second image 62c is calculated.

The image conversion unit 53 determines the position of the point 64a with respect to the center point 81a in the pixel 85a. In the example illustrated in FIG. 7, the point 64a is disposed on the right side of the center point 81a, and is disposed lower than the center point 81a. The image conversion unit 53 selects the pixel 85b and the pixel 85c as two pixels that are the closest to the point 64a.

Figure 8:
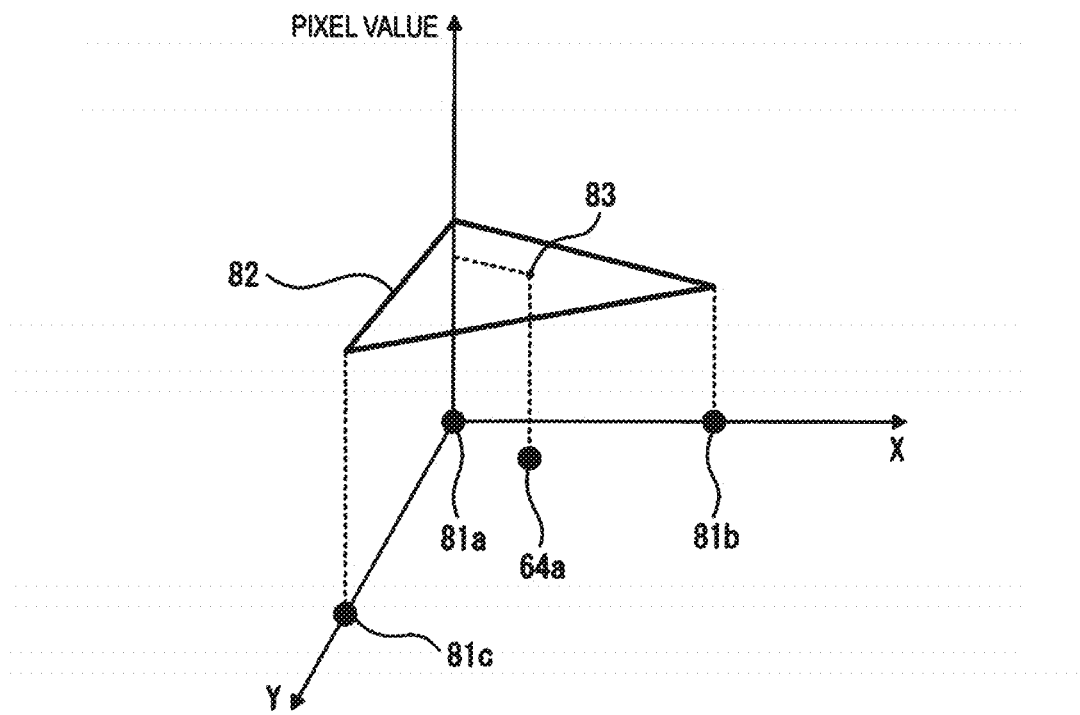
FIG. 8 is an explanatory diagram concerning a method for calculating pixel values in the second image at the time of being assumed that the image is captured at the detection position.

FIG. 8 shows a diagram for explaining linear interpolation applied when the value of the pixel in the second image is calculated. The center points 81a, 81b, 81c of the respective pixels 85a, 85b, 85c are set in the image coordinate system 73 including the X-axis and the Y-axis. In addition, a coordinate axis that relates to pixel values is set so as to be perpendicular to the X-axis and the Y-axis. The image conversion unit 53 calculates a plane 82 that passes through the pixel values of the respective center points 81a, 81b, 81c. The image conversion unit 53 calculates a line that extends from the point 64a and is perpendicular to the plane including the X-axis and the Y-axis. The image conversion unit 53 calculates an intersection point 83 between this line and the plane 82. The image conversion unit 53 may employ the pixel value of the intersection point 83 as the pixel value of the pixel including the point 64b in the second image 62c.

As described above, the camera 6 can capture a plurality of first images in which the positions for the imaging are different from each other. The image conversion unit 53 coverts the plurality of the first images so as to generate a plurality of the second images that correspond to the detection position. The image conversion unit 53 calculates the corresponding positions in the first images that correspond to pixels in second images. The image conversion unit 53 can calculate the value of the pixel in the second image, on the basis of the value of the pixel including the corresponding position in the first image and the value of the pixel adjacent to the pixel including the corresponding position. By adopting this control, the pixel value can be calculated more accurately in the image after conversion.

In addition, as described above, the image conversion unit 53 can calculate the value of the pixel in the second image by interpolation or extrapolation, on the basis of the value of the pixel including a corresponding position and values of a plurality of pixels in the vicinity of the corresponding position. By adopting this control, the pixel value of the pixel in the second image can be calculated in a more accurate manner even when the corresponding position does not match the center of the pixel in the first image. Although pixel values of two pixels that are closest to the corresponding position are employed in the embodiment described above, the embodiment is not limited to this, and it may be possible to employ pixel values of three or more pixels that are close to the corresponding position.

Referring to FIGS. 2 and 5, the image conversion unit 53 can generate second images 62a, 62b, 62c so as to correspond to detection positions, on the basis of the first images 61a, 61b, 61c that are actually captured.

The image control unit 51 includes a composition unit 54 that composites a plurality of second images 62a, 62b, 62c that are converted by the image conversion unit 53 so as to generate a composite image 63 that corresponds to the image that is captured at the detection position. The composition unit 54 composites the plurality of the second images 62a, 62b, 62c so as to generate the composite image 63 as indicated by the arrow 94.

The composition unit 54 calculates the value of the pixel included in the composite image 63 on the basis of values of pixels included in the second images 62a, 62b, 62c. The composition unit 54 selects a pixel of which the center point is a point 64c in the composite image 63. In addition, the composition unit 54 can set the average value of values of pixels in the second images 62a, 62b, 62c, the pixels each having the point 64c as the center thereof, for the value of the pixel of the point 64c in the composite image 63. Alternatively, the composition unit 54 may set the minimum value or the maximum value of pixel values in the second images 62a, 62b, 62c, for the value of the pixel in the composite image 63. For example, by employing the average value, the median value, or the minimum value of values of pixels in the second images 62a, 62b, 62c, it is possible to exclude the value of the pixel of an unclear portion due to halation. In addition, the composition unit 54 can set the statistic of values of pixels in the plurality of the second images 62a, 62b, 62c converted by the image conversion unit 53, for the value of the pixel in the composite image 63.

In addition, the composition unit 54 may exclude a pixel of which pixel value is significantly large or of which pixel value is significantly small. The operator may predetermine outliers in connection with the pixel value. The composition unit 54 can exclude a pixel of which pixel value falls outside of a predetermined range on the basis of the outliers. In addition, the composition unit 54 may obtain values of all pixels and set outliers by using a statistical method. Alternatively, a pixel including an outlier may be excluded by using a value that can be calculated from a pixel value such as an intensity gradient, instead of by using the pixel value itself.

Note that a black portion where brightness is set to be zero exists in the second images 62a, 62b, 62c. The composition unit 54 can exclude the pixel value of this portion in order to calculate a pixel value when creating the composite image 63. The correct shape is not shown for the shape of a portion of the workpiece 38 that falls outside of the detection surface 75. However, a portion other than a portion having features on the detection surface 75 is made unclear by composing a plurality of second images. A portion that falls outside of the detection surface 75 does not cause any trouble because detection of the workpiece 38 is performed by using a portion on the detection surface 75 that has features.

The imaging device according to the present embodiment can reduce an effect of environmental light or an effect of a reduction of contrast depending on illumination or tilting of a workpiece. In addition, when the halation occurs, a portion where the halation occurs can be corrected. Thus, a clear image when the image is assumed to be captured from the detection position can be obtained. The imaging device according to the present embodiment can capture features of an object even if the environmental light largely changes or brightness of the object largely changes. In other words, the imaging device according to the present embodiment can obtain an image in which features of a workpiece are clearly shown.

The imaging device according to the present embodiment includes a composite image processing unit 55 that detects a workpiece 38 on the detection surface 75 on the basis of the composite image 63. The composite image processing unit 55 detects the position of the workpiece 38 on the basis of feature points of the workpiece 38 in the composite image 63. For example, the operator can create in advance an image obtained by capturing the image of the workpiece 38 by using a camera 6 disposed at the detection position. The storage unit 56 can store in advance this image as a reference image. The composite image processing unit 55 can calculate the position of the workpiece on the detection surface 75 on the basis of the reference image.

The image control unit 51 sends the detected position of the workpiece 38 to the operation control unit 43. On the basis of the obtained position of the workpiece 38, the operation control unit 43 corrects the position and the orientation of the robot 1 set in the operation program 41. In other word, the position and the orientation of the hand 5 when the workpiece 38 is gripped is corrected. Thus, the operation control unit 43 can drive the robot 1 and the hand 5 so as to grip the workpiece 38.

Although, in the case of the first robot system 3, the position of the workpiece 38 on the mounting table 95 is detected in order to grip the workpiece 38 fixed on the mounting table 95, the embodiment is not limited to this. The composite image processing unit 55 of the image control unit 51 can perform inspection on the workpiece 38 on the basis of the composite image. For example, the composite image processing unit can measure the size of the workpiece from the composite image. The robot system can perform inspection of the size of the workpiece on the basis of a predetermined determination value of the size. The inspection of the workpiece is not limited to inspection of the size of a workpiece, and any inspection of the workpiece may be performed. For example, the inspection in which it is determined whether or not a predetermined part is disposed on the surface of the workpiece can be performed. Alternatively, the inspection in which it is determined whether or not any damage exists on the surface of the workpiece can be performed.

Although the first robot system 3 is formed such that the position of the workpiece is fixed, and the camera is moved by the movement device, the embodiment is not limited to this. The position of the camera may be fixed and the workpiece may be moved by the movement device.

Figure 9:
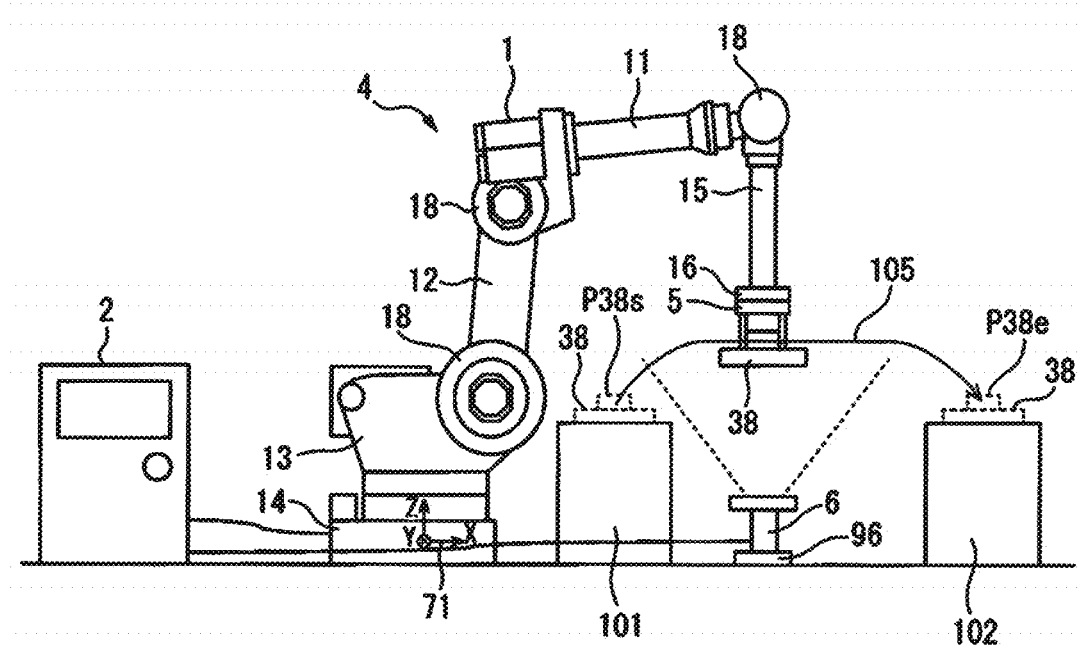
FIG. 9 is a side view of a second robot system according to the embodiment.

FIG. 9 shows a side view of a second robot system according to the present embodiment. In the second robot system 4, the camera 6 is fixed on the mounting table 96. The workpiece 38 is supported by the robot 1. The second robot system 4 conveys the workpiece 38 mounted on the mounting table 101 to the mounting table 102 as indicated by the arrow 105. The position and the orientation of the robot 1 change, whereby the workpiece 38 is conveyed from the position P38s to the position P38e. The imaging device of the second robot system 4 detects a positional deviation of the workpiece 38 within the hand 5 when the hand 5 grips the workpiece 38.

Figure 10:
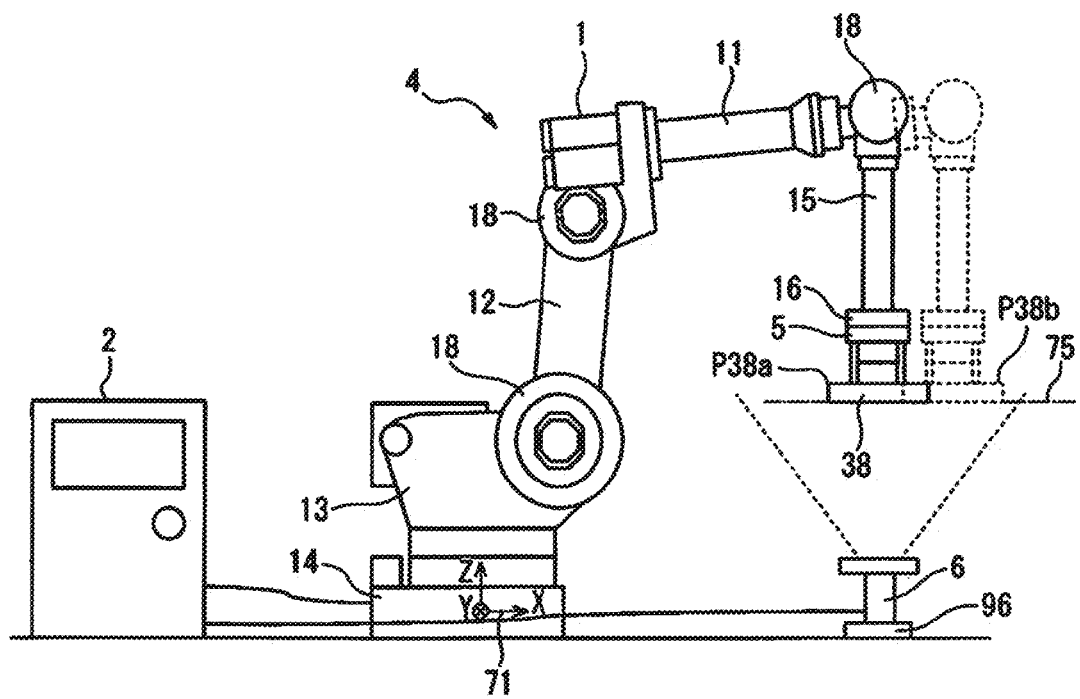
FIG. 10 is another side view of the second robot system of the embodiment.

FIG. 10 shows another side view of the second robot system 4. With reference to FIGS. 2 and 10, the camera 6 is fixed at a predetermined position. The detection surface 75 including a bottom surface of the workpiece 38 is set in advance. In addition, a plurality of positions P38a, P38b of the workpiece 38 at the time of capturing the image of the workpiece 38 by using the camera 6 are determined in advance. The positions and the orientations of the robot 1, which correspond to the positions P38a, P38b of the workpiece 38, are predetermined and set in the operation program 41. Furthermore, a detection position of the workpiece 38 used for detecting the workpiece 38 is determined in advance. The position and the orientation of the robot 1 used for positioning the workpiece 38 at the detection position are stored in the storage unit 56 as a set position of the movement device. The detection position of the workpiece 38 may be set at any position in which the camera 6 can capture the image of the workpiece 38. The camera 6 is calibrated so as to be able to calculate the line of sight of the camera 6 in the reference coordinate system 71, which corresponds to a point in the image coordinate system 73.

The robot 1 moves the workpiece 38 in order to capture a plurality of first images by using the camera 6. The camera 6 captures the images of the workpiece 38 at the time when the workpiece 38 is disposed at the plurality of the positions P38a, P38b. The position acquisition unit 52 obtains positions and orientations of the robot 1 when the images of the workpiece 38 are captured. The position acquisition unit 52 calculates the positions P38a, P38b of the workpiece 38 on the basis of the position and the orientation of the robot 1. The storage unit 56 stores a set of the first image to be captured and the position of and the orientation of the robot 1 that correspond to each of a plurality of positions P38a, P38b of the workpiece 38. In other words, the storage unit 56 stores a plurality of sets of the first image and the position of the movement device.

On the basis of the position and the orientation of the robot 1 when the image of the workpiece 38 is captured, the image conversion unit 53 converts a plurality of first images captured by the camera 6 into a plurality of second images so that the relative positional relationship between the workpiece 38 and the camera 6 is the same as that between when the image is captured at the set position and when the image is captured at the time when the workpiece 38 is located at the position P38a, P38b. In the case of the second robot system 4, it is possible to calculate the line of sight of the camera 6 expressed in the reference coordinate system 71 on the basis of the position of a point expressed in the image coordinate system 73. Alternatively, it is possible to calculate the position of a point expressed in the image coordinate system 73 on the basis of a point expressed in the reference coordinate system 71.

The composition unit 54 composites a plurality of second images converted by the image conversion unit 53 so as to generate a composite image. The composite image processing unit 55 can detect the position of the workpiece 38 on the basis of feature points of the workpiece in the composite image. The composite image processing unit 55 can correct a deviation occurring when the workpiece 38 is gripped, on the basis of the position and the orientation of the robot 1 and the position of the workpiece 38.

Here, with reference to FIG. 9, a method for correcting a deviation occurring when the workpiece 38 is gripped will be described. In the following description, symbols indicating positions such as W1 and P2 are homogeneous transformation matrices. In the present embodiment, a relative position of the workpiece 38 with respect to the tip part of an arm of the robot 1 is measured in order to correct a deviation in gripping the workpiece 38 within the hand 5. When a position of the robot 1 at the time when the workpiece 38 is assumed to be disposed at a detection position is represented by Q1' and a position of the workpiece 38 in the reference coordinate system 71 is represented by W1', the relative position V1' of the workpiece 38 with respect to the tip part of the arm of the robot 1 can be calculated by using the following equation (1).

$$V1' = Q1'^{-1} \cdot W1' \tag{1}$$

In addition, in connection with the position P2 of the workpiece 38 gripped when the final position P38e of the workpiece 38 is taught, it is possible to calculate the position P2' where the workpiece 38 is to be released by using the following equation (2), where V1 is a relative position of the workpiece 38 with respect to the tip part of the arm of the robot 1. The robot 1 can release the workpiece 38 at the position P2' after correction.

$$P2' = P2 \cdot V1 \cdot V1'^{-1} \tag{2}$$

In the embodiment described above, the composite image processing unit 55 corrects the deviation occurring at the time of gripping the workpiece 38 on the basis of the composite image, but the embodiment is not limited to this. The composite image processing unit 55 can perform inspection on the workpiece 38 by using feature points of the workpiece 38 on the detection surface 75 in the same way as the first robot system. Other configurations, operations, and effects of the second robot system are similar to those of the first robot system according to the present embodiment.

Figure 11:
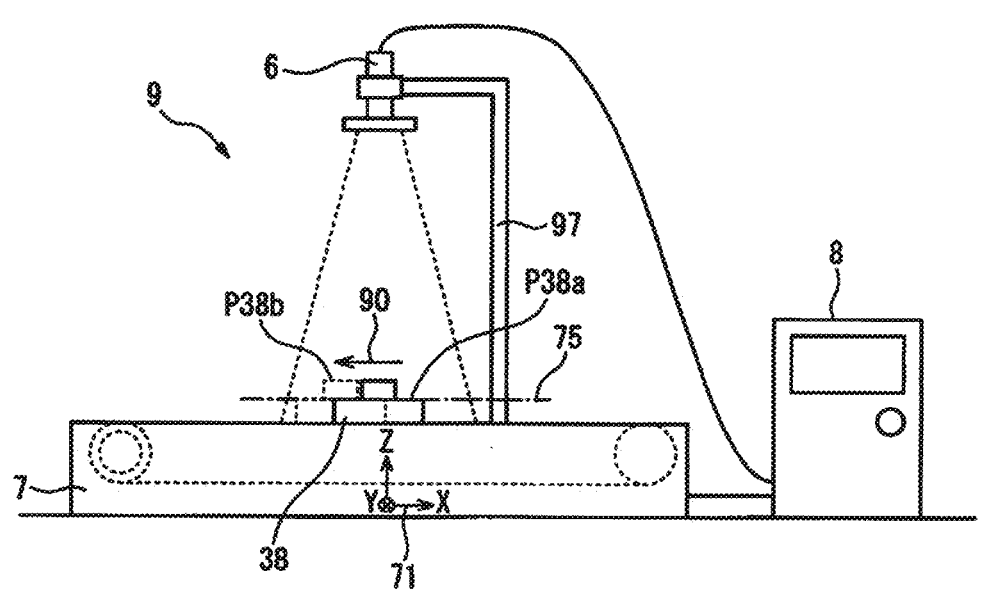
FIG. 11 is a side view of a conveyance system according to the embodiment.
Figure 12:
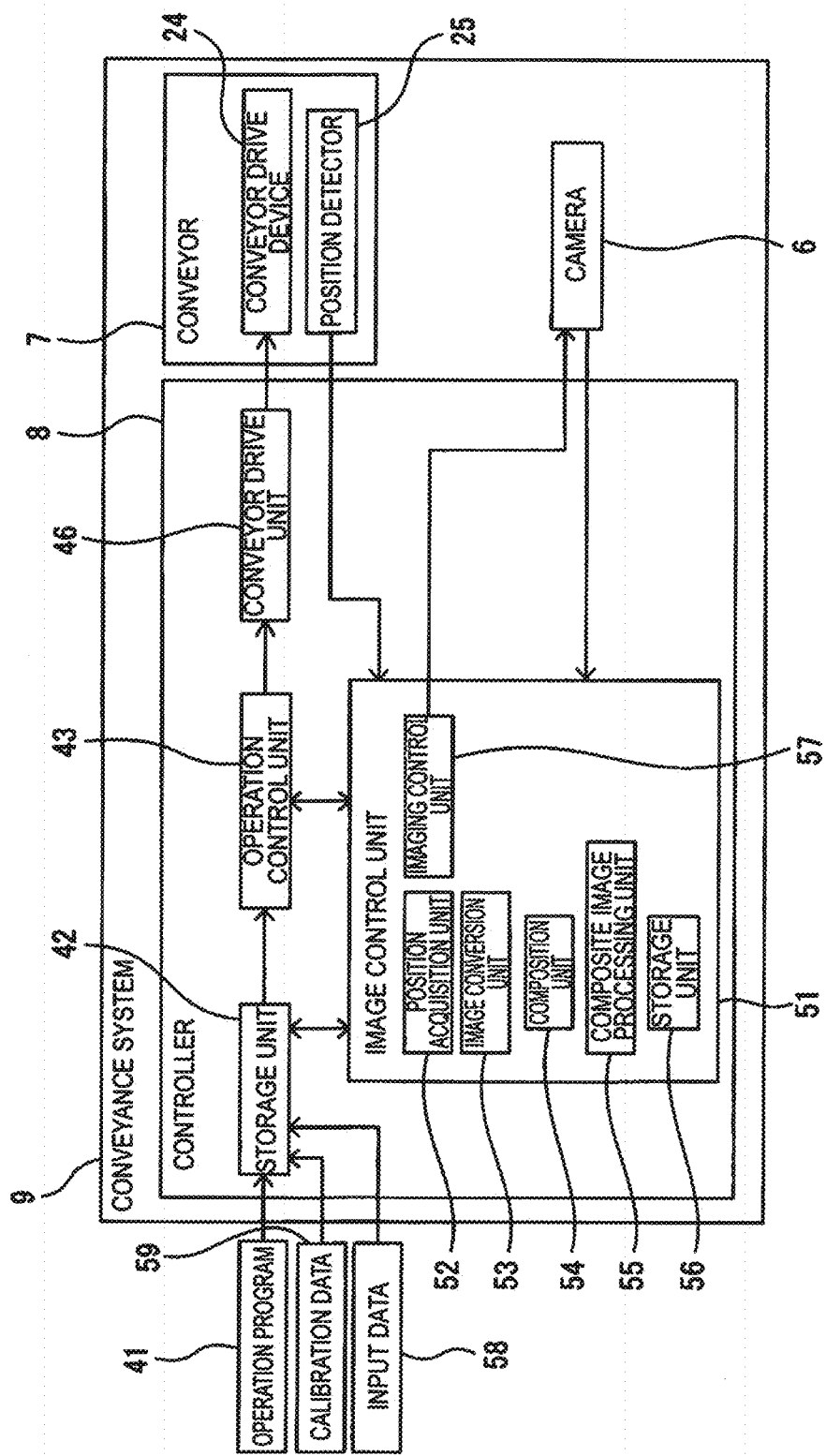
FIG. 12 is a block diagram of the conveyance system according to the embodiment.

FIG. 11 shows a side view for illustrating a conveyance system according to the present embodiment. FIG. 12 shows a block diagram for illustrating the conveyance system according to the present embodiment. With reference to FIGS. 11 and 12, a conveyance system 9 includes an imaging device. The conveyance system 9 includes a conveyor 7 that serves as the movement device that moves the workpiece 38. The conveyance system 9 has a configuration in which the conveyor 7 is disposed instead of the robot 1 of the second robot system 4. The workpiece 38 moves in a direction indicated by the arrow 90 with the conveyor 7 being driven. In other words, when the conveyor 7 drives, the position of the workpiece 38 changes, whereby the relative position between the vision sensor and the workpiece 38 changes. The camera 6 that serves as the vision sensor is supported by a support member 97.

The conveyance system 9 includes a controller 8 that controls the conveyor 7 and the camera 6. The controller 8 is composed of an arithmetic processing device including a CPU and the like. The controller 8 includes a conveyor drive unit 46. The conveyor 7 includes a conveyor drive device 24 that has a drive motor for driving a belt. Each drive motor is provided with a position detector 25 that serves as a state detector and detects the rotational position of the drive motor.

The controller 8 functions as an image processing device. The controller 8 includes an image control unit 51 in the same way as the controller 2 of the robot system illustrated in FIG. 2. The camera 6 is fixed at a predetermined position so as to be able to capture the image of a workpiece 38. A detection surface 75 including a surface of the workpiece 38 is set in advance. In addition, a plurality of positions P38a, P38b of the workpiece 38 used for capturing the image of the workpiece 38 by using the camera 6 are determined in advance. Positions of the belt of the conveyor 7, which correspond to the positions P38a, P38b of the workpiece 38, are set in the operation program 41. Furthermore, a detection position of the workpiece 38 used for detecting the workpiece 38 is determined in advance. The position of the belt used for positioning the workpiece 38 at the detection position is stored in the storage unit 56 as a set position of the movement device.

The conveyor 7 moves the workpiece 38 in order to capture a plurality of first images by using the camera 6. In addition, the camera 6 captures images of the workpiece 38 at the time when it is disposed at the plurality of the positions P38a, P38b. The position acquisition unit 52 obtains the position of the belt of the conveyor 7 when the image of the workpiece 38 is captured, from an encoder such as the position detector 25 attached to the conveyor 7. The position acquisition unit 52 calculates the positions P38a, P38b of the workpiece 38 on the basis of positions of the belt of the conveyor 7. The storage unit 56 stores a set of the captured first image and the positions of the belt of the conveyor 7 that correspond to the positions P38a, P38b of the workpiece 38. The storage unit 56 stores a plurality of sets of the first image and the position of the movement device. After this, the image conversion unit 53 converts the first images into second images that correspond to the detection positions in the same way as the second robot system 4. In other words, the first images are converted into the second images when the images are assumed to be captured at the set position of the conveyor. The composition unit 54 composites the plurality of the second images that correspond to the detection positions. The composite image processing unit 55 can perform detection or inspection of the position of the workpiece 38.

Other configurations, operations, and effects of the conveyance system are similar to those of the first robot system and the second robot system according to the present embodiment.

Figure 13:
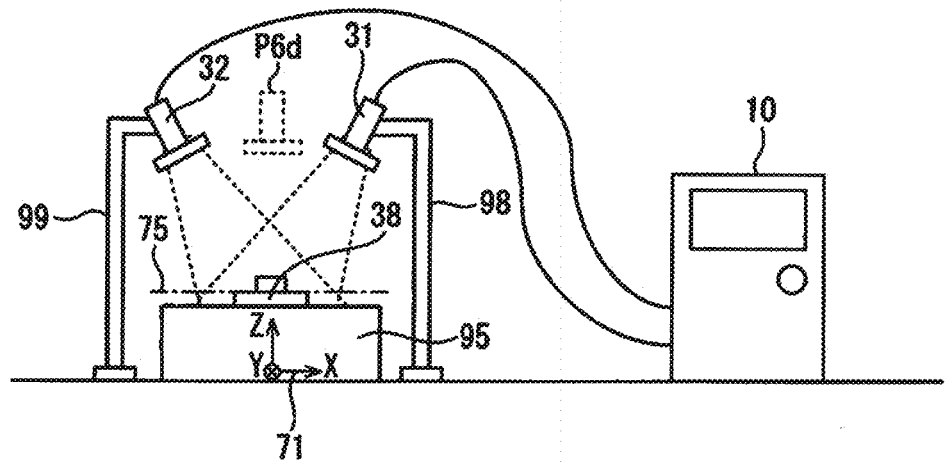
FIG. 13 is a side view of an imaging device according to the embodiment.
Figure 14:
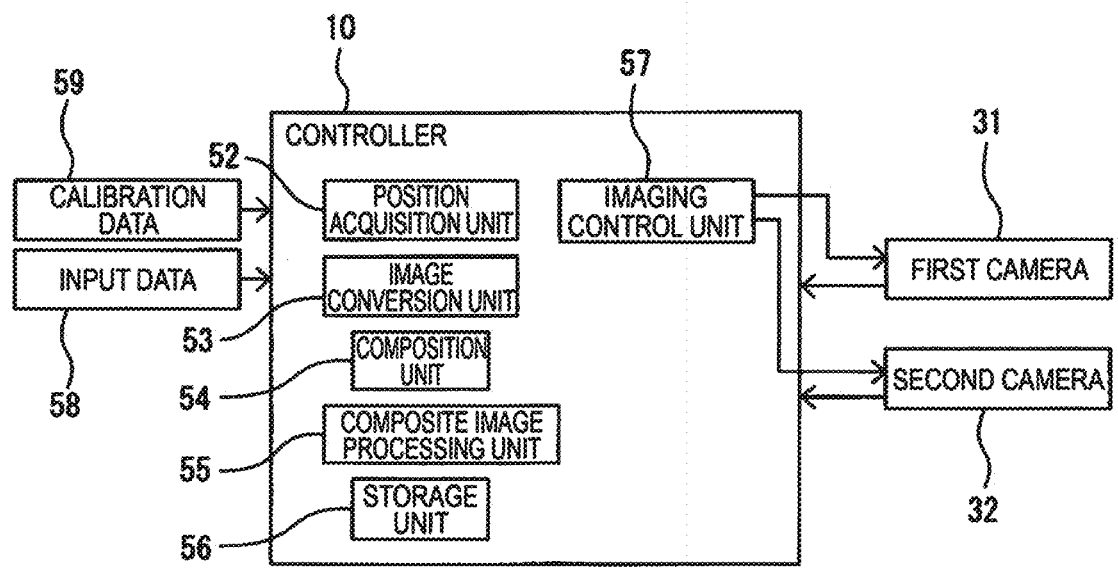
FIG. 14 is a block diagram for illustrating the imaging device according to the embodiment.

FIG. 13 shows a side view of an imaging device according to the present embodiment. FIG. 14 shows a block diagram of the imaging device according to the present embodiment. The imaging device may not include movement devices such as the robot 1 and the conveyor 7 described above. In the imaging device illustrated in FIGS. 13 and 14, both of the workpiece 38 and the cameras 31, 32 are fixed at predetermined positions. The imaging device illustrated in FIGS. 13 and 14 includes a plurality of cameras 31, 32, instead of having a configuration in which positions of the camera 6 capturing the image are changed by the robot 1 in the first robot system 3 according to the present embodiment. In addition, a plurality of first images are captured by using a plurality of cameras 31, 32 disposed at different positions.

The imaging device includes a mounting table 95 that serves as a first fixation part that fixes the workpiece 38, and a plurality of cameras 31, 32 that serve as a plurality of vision sensors that each image a first image of the workpiece 38. The first camera 31 and the second camera 32 are supported by support members 98, 99 that each serve as a second fixation part. The cameras 31, 32 are spaced apart from each other such that the image of the workpiece 38 is captured from positions that are different from each other.

The imaging device includes a controller 10 that serves as an image processing device that processes the first images captured by the cameras 31, 32. The controller 10 is composed of an arithmetic processing device including a CPU and the like. The controller 10 has a configuration similar to that of the image control unit 51 of the robot system illustrated in FIG. 2. The imaging control unit 57 sends the commands for capturing the images to the first camera 31 and the second camera 32. The storage unit 56 stores a set of the first images captured by the first camera 31 and the second camera 32 and the positions of the cameras 31, 32 that capture the first images.

A reference coordinate system 71 is set in advance in the imaging device. In the example illustrated in FIG. 13, the reference coordinate system 71 is set in the mounting table 95. In addition, a detection surface 75 is defined on the workpiece 38 fixed on the mounting table 95. In addition, a detection position P6d of the camera used for detecting the workpiece 38 is determined in advance, and is stored in the storage unit 56. Each of the cameras 31, 32 is calibrated so as to be able to calculate the line of sight of the camera in the reference coordinate system 71, which corresponds to a point in the image coordinate system 73.

The position acquisition unit 52 of the controller 10 obtains predetermined positions of the cameras 31, 32. The image conversion unit 53 converts a plurality of first images captured by the plurality of the cameras 31, 32 into second images when the images are assumed to be captured at the detection position P6d. The image conversion unit 53 converts the first images on the basis of the positions of the cameras 31, 32. In addition, the composition unit 54 composites the plurality of the second images converted by the image conversion unit 53 so as to generate a composite image. The composite image processing unit 55 can perform at least one of detection and inspection of the workpiece 38 on the detection surface 75 on the basis of the composite image. For example, the composite image processing unit 55 can perform inspection of the size of the workpiece 38 on the basis of a predetermined determination value. Alternatively, a robot or the like that conveys the workpiece 38 may be additionally disposed. The imaging device can detect the position of the workpiece 38 on the mounting table 95 and send it to a controller of the robot or the like.

Although two cameras are disposed in the example illustrated in FIGS. 13 and 14, the embodiment is not limited to this. The imaging device may include three or more cameras. The image conversion unit 53 may convert first images of which number corresponds to the number of cameras.

Other configurations, operations, and effects of the imaging device are similar to those of the first robot system, the second robot system, and the conveyance system according to the present embodiment.

Although the embodiment described above includes the detection of the position of the workpiece from among various types of detection of the workpiece, the embodiment is not limited to this. The control according to the present embodiment can be applied to any control for detecting a workpiece. For example, the imaging device may perform the control for determining whether or not the workpiece is disposed within a predetermined area. Alternatively, when a large number of workpieces are disposed, the imaging device may perform the control for determining whether or not the predetermined number of workpieces exist.

In addition, although one detection surface is disposed for each workpiece in the embodiment described above, the embodiment is not limited to this, and it may be possible to dispose a plurality of detection surfaces for each workpiece. The imaging device may perform at least one of detection and inspection of the workpiece for each of the detection surfaces.

According to one aspect of the present disclosure, it is possible to provide the imaging device that can obtain features of the object even if the environmental light largely changes or the brightness of the object largely changes.

The above-described embodiment can be combined as appropriate. Identical or equivalent parts are given identical reference numerals in the above-described drawings. Note that the above-described embodiments are merely examples and are not intended to limit the invention. Changes to the embodiment as indicated in the claims are also included in the embodiment.

The invention claimed is:

1. An imaging device, comprising:
   a vision sensor configured to capture a plurality of first images of a workpiece such that relative positions of the vision sensor with respect to the workpiece mutually differ;
   a movement device configured to move one of the workpiece or the vision sensor so as to change a relative position of the one of the workpiece or the vision sensor with respect to the other of the workpiece or the vision sensor; and
   an image processing device configured to process the plurality of first images, the image processing device including
      a storage unit configured to store
         each of the plurality of first images and a position of the movement device at a time of capturing said each of the plurality of first images as a set, and
         a detection surface defined on the workpiece and a set position serving as a position of the movement device, wherein the detection surface and the set position are determined in advance,
      an image conversion unit configured to convert said each of the plurality of first images into each of a plurality of second images,
         wherein said each of the plurality of second images is an image captured at the set position on the basis of the position of the movement device at the time of capturing said each of the plurality of first images,
      a composition unit configured to generate a composite image into which the plurality of second images is composited, and
      a composite image processing unit configured to perform at least one of detection or inspection of the workpiece on the detection surface on the basis of the composite image.

2. The imaging device of claim 1, wherein the movement device is a robot configured to move either one of the workpiece or the vision sensor.

3. The imaging device of claim 1, wherein the movement device is a conveyor configured to convey the workpiece.

4. The imaging device of claim 1, wherein
   the image conversion unit is configured to
      calculate a corresponding position in a first image of the plurality of first images, the corresponding position corresponding to a pixel in a second image of the plurality of second images, and
      calculate a value of the pixel in the second image of the plurality of second images on the basis of a value of a pixel including the corresponding position and a value of a pixel adjacent to the pixel including the corresponding position.

5. The imaging device of claim 4, wherein
   the image conversion unit is configured to calculate the value of the pixel in the second image of the plurality of second images, on the basis of the value of the pixel including the corresponding position in the first image of the plurality of first images and a value of each of a plurality of pixels in a vicinity of the corresponding position.

6. The imaging device of claim 1, wherein the composition unit is configured to set a statistic of values of pixels in the plurality of the second images, for a value of a pixel in the composite image.

7. An imaging device, comprising:
a plurality of vision sensors configured to capture a plurality of first images of a workpiece from positions different from each other;
a first fixation part configured to fix the workpiece;
a second fixation part configured to fix each of the plurality of vision sensors;
an image processing device configured to process the plurality of first images, the image processing device including
a storage unit configured to store
each of the plurality of first images captured by the plurality of vision sensors and each position of the plurality of vision sensors that captured the plurality of the first images as a set, and
a detection surface defined on the workpiece and a detection position serving as a position of a vision sensor of the plurality of vision sensors, wherein the detection surface and the detection position are determined in advance,
an image conversion unit configured to convert each of the plurality of first images captured by the plurality of vision sensors into each of a plurality of second images,
wherein said each of the plurality of second images is an image captured at the detection position on the basis of a position of said each of the plurality of vision sensors,
a composition unit configured to generate a composite image into which the plurality of second images is composited, and
a composite image processing unit configured to perform at least one of detection or inspection of the workpiece on the detection surface on the basis of the composite image.

8. An imaging device, comprising:
a vision sensor configured to capture a plurality of first images of a workpiece such that relative positions of the vision sensor with respect to the workpiece mutually differ;
a movement device including a robot or a conveyor, the movement device configured to move one of the workpiece or the vision sensor so as to change a relative position of the one of the workpiece or the vision sensor with respect to the other of the workpiece or the vision sensor; and
an image processing device configured to process the plurality of first images, the image processing device including
a storage unit configured to store
each of the plurality of first images and a position of the movement device at a time of capturing said each of the plurality of first images as a set, and
a detection surface defined on the workpiece and a set position serving as a position of the movement device, wherein the detection surface and the set position are determined in advance, and
a processor configured to
convert said each of the plurality of first images into each of a plurality of second images, wherein said each of the plurality of second images is an image captured at the set position based on the position of the movement device at the time of capturing said each of the plurality of first images,
generate a composite image into which the plurality of second images is composited, and
perform at least one of detection or inspection of the workpiece on the detection surface based on the composite image.

* * * * *